INVENTOR.
ROBERT C. SCOTT
BY Kenway, Jenney & Hildreth
ATTORNEYS

INVENTOR.
ROBERT C. SCOTT
BY
ATTORNEYS

June 30, 1964 R. C. SCOTT 3,138,951
PORTABLE HARDNESS TESTER
Filed Oct. 31, 1960 3 Sheets-Sheet 3
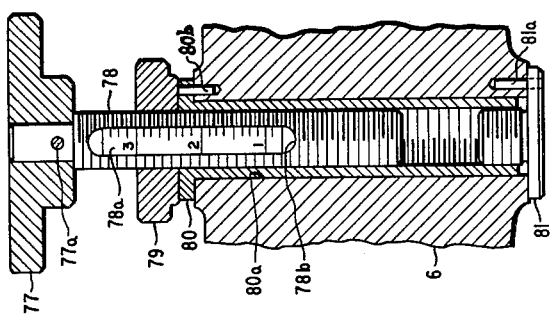
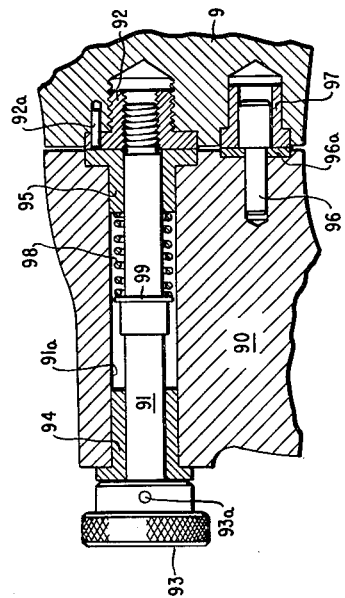
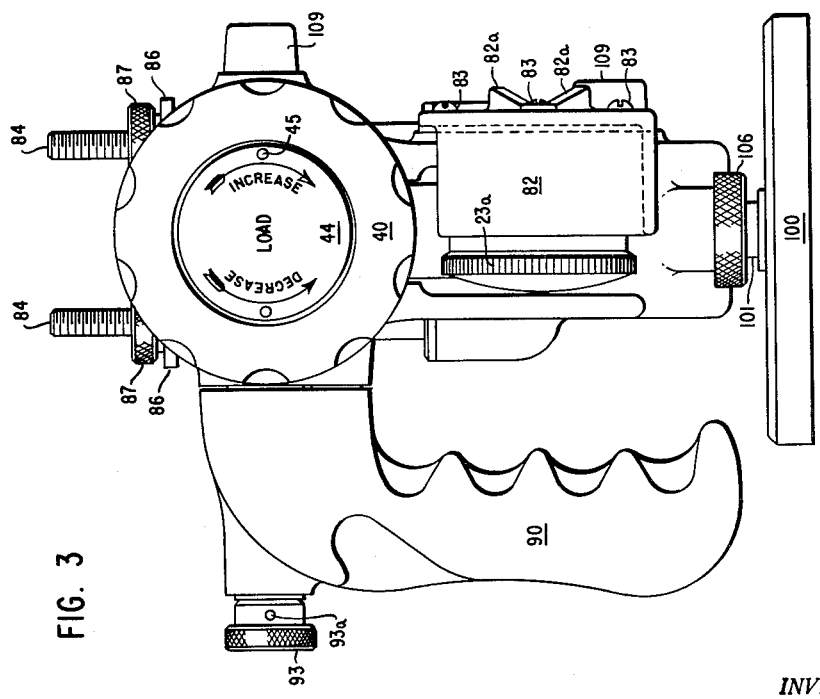
INVENTOR.
ROBERT C. SCOTT
BY
Kenway, Jenney & Hildreth
ATTORNEYS

United States Patent Office 3,138,951
Patented June 30, 1964

3,138,951
PORTABLE HARDNESS TESTER
Robert C. Scott, 340 Common St., Belmont, Mass.
Filed Oct. 31, 1960, Ser. No. 66,148
2 Claims. (Cl. 73—81)

This invention relates to portable machines for testing the hardness of materials, especially metals, but including plastics and other forms of synthetic and natural materials that are in the solid state, the measurement of whose property of hardness is of importance.

In my co-pending application Serial No. 56,766, filed September 14, 1960, and entitled "Horizontal Hardness Tester," there is shown an improved hardness tester in which a penetrator spindle assembly and a first anvil spindle assembly are adjustably mounted in a frame for movement along a penetration axis to support and test work-pieces of various sizes. A second anvil spindle assembly is adjustably mounted in the frame of the tester for movement along an axis transverse to the penetration axis to assist in supporting specimens of various shapes and sizes.

It is the primary object of the present invention to provide an improved hardness tester with means for supporting the hardness tester in a fixed position upon a work-piece for carrying out hardness tests. It is a further object of this invention to provide an improved portable hardness tester with means adapting the tester to be adjustably supported upon a longitudinally extensive work-piece for movement therealong, to carry out a series of hardness tests. It is still a further object of this invention to provide an improved hardness tester, of the type described in the aforementioned application, with mounting means adapting the tester to be supported alternatively upon a work-piece, by the hand of the operator, or upon a stationary support.

In carrying out the aforementioned objects, I provide an improved hardness tester in which various features are combined. The hardness tester includes a main frame having a pair of spaced-apart bracket portions, which respectively support a penetrator spindle assembly and a first anvil spindle assembly adjustably, for movement along a penetration axis. A second anvil spindle assembly is adjustably supported in the main frame for movement along an axis transverse to the penetration axis. These means are similar to those described in my aforementioned application. According to a feature of the present invention, I provide means comprising a yoke adjustably secured to the main frame for suspending the main frame upon a work-piece which is preferably of circular cross section. The yoke and the second anvil are adjustable transversely to the penetration axis for clamping the work-piece therebetween, and the first anvil is adjustable along the penetration axis to additionally support the hardness tester in a fixed position upon the work-piece. The penetrator is applied to the work-piece along the penetration axis in carrying out a hardness test, and the yoke, the first and second anvils, and the penetrator contact the work-piece at circumferentially spaced points to fixedly support the hardness tester in a desired position. This arrangement of support means permits the tester to be moved longitudinally along an extensive work-piece, so that a series of hardness tests may be made along the length thereof with great facility.

According to a further feature of the invention, I provide an indicator which cooperates with the second anvil spindle assembly to facilitate the adjustment of the anvil to a position at a predetermined radial distance from the penetration axis. These means permit the setting of the second anvil to position a cylindrical work-piece with its axis of symmetry intersecting the penetration axis, so that plane faces of the anvils and the yoke engage the work-piece tangentially, and the penetrator contacts the work-piece radially, thus insuring rigid support of the tester and increased accuracy of test results. I further provide a removable handle and a removable base plate by which the portable hardness tester may be alternatively supported by hand or upon a bench.

While the subject matter which I regard as my invention is particularly pointed out in the appended claims, it is believed that the invention will be more clearly understood from the following detailed description of a preferred embodiment thereof, referring to the accompanying drawings, in which:

FIG. 3 is an end view;

FIG. 4 is a sectional view of a height-adjustable work rest; and

FIG. 5 is a fragmentary sectional view of handle fastening and aligning means.

Figure 1:
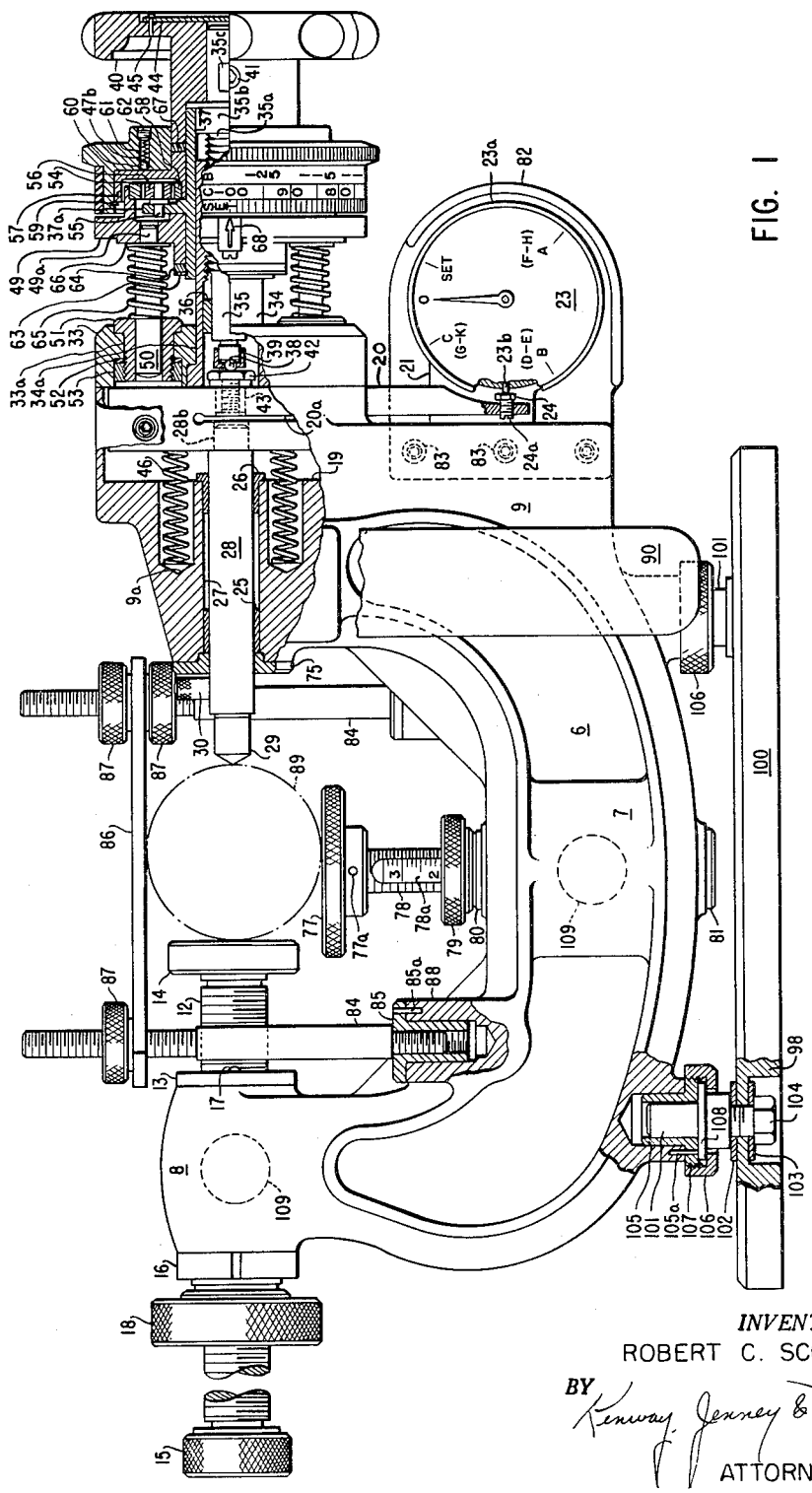
FIG. 1 is a view in side elevation, and partially in section, showing a preferred embodiment of my improved hardness testing machine, including accessories requisite for extending the versatility of the machine in testing the hardness of materials having diverse geometrical shapes and dimensions.
Figure 2:
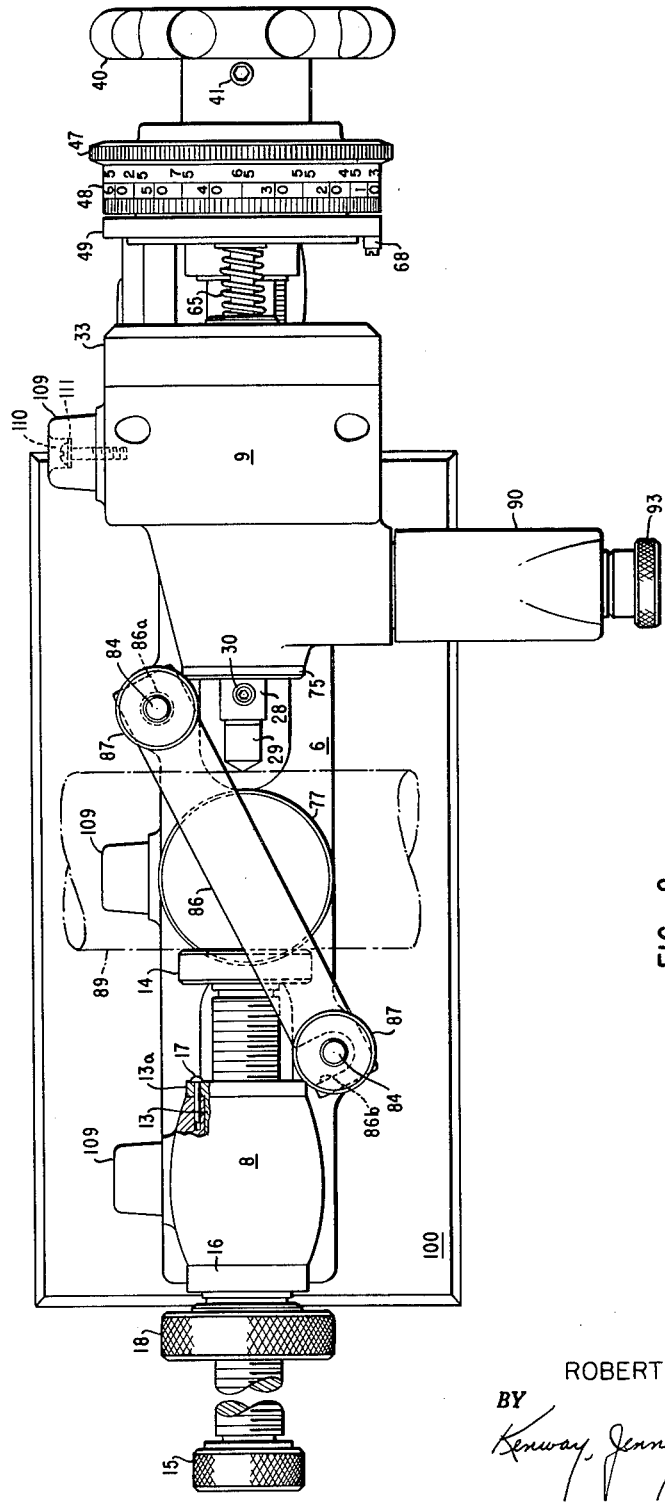
FIG. 2 is a top plan view of the machine with the accessories attached.

An improved machine that has been developed by me and found to work satisfactorily is illustrated in the drawings, and includes a main frame 6 which supports the various parts of the machine. The main frame is formed as a C-frame having an I-shaped cross section and a reinforced section 7 centered on the vertical axis. The main frame is preferably cast of a lightweight material such as magnesium in order to minimize weight, and is proportioned and reinforced to provide maximum strength and resistance to structural deformation when in use. After casting and machining, respectively, the main frame is aged and stress relieved to assure dimensional stability and alignment of the related parts when assembled.

Two spaced-apart vertical supporting brackets 8 and 9 in the main frame casting support a first anvil spindle assembly and a penetrator spindle assembly, respectively. These assemblies are aligned on a common penetration axis, as shown.

*First Anvil Spindle Assembly*

The first anvil spindle assembly includes an anvil spindle 12, which is preferably made of hardened stainless steel, and is precision threaded throughout its length for engagement with a mating thread formed through a spindle bushing 13 received by the bracket 8. The spindle carries an anvil 14 for supporting a test specimen. A knob 15 is press-fitted to the spindle and serves as a finger grip for effecting threading movement of the spindle along the penetration axis. This spindle bushing 13, preferably made of unhardened stainless steel, receives a bushing lock-nut 16 in threaded engagement thereon. The bushing is pressfitted into the bracket 8, and is secured in position by the bushing lock-nut 16 and by stainless steel drive pins 17, which are pressed through a flange 13a formed in the bushing and into the bracket. A stainless steel spindle lock-nut 18 is threaded on the spindle against the bushing lock-nut 16 to lock the spindle in position by forcing the thread faces of the spindle and bushing together in a direction and manner that precludes even the slightest relative motion between the spindle and bushing when a load is applied to the anvil during the making of a hardness test. The anvil 14 is preferably made of precision-machined hardened stainless steel, and has a supporting and centering shank (not shown) fitted into a bored hole in the spindle in a manner that not only permits interchangeability with anvils of various shapes, but also precludes even the slightest relative motion between the contacting faces of the anvil and spindle during the making of a hardness test.

Penetrator Spindle Assembly and Load Indicator

The bracket 9 is provided with a rectangularly shaped recess 19 to provide clearance space for a load spring 20. I prefer to make the load spring of beryllium copper, suitably heat treated after fabricating and machining to provide elastic deflection with negligible hysteresis error and drift under maximum loading. The load spring is longitudinally slotted at 20a to form a compression type of hairpin spring with left and right sections. At the outer end of the load spring, an indicator bracket 21 made of light-weight material such as aluminum alloy is securely fastened to the left section. Clearance space is provided between the bracket and the right spring section to permit freedom of flexure of the spring sections. A sensitive dial indicator 23, having a rotatable bezel 23a for adjusting the dial position, is securely fastened to the bracket. A spring-loaded indicator spindle 23b rests firmly on the highly polished flat surface of a hardened stainless steel button 24, which is threaded into the right section of the load spring and slotted at 24a.

For Retaining the Button in Position

The button 24 is so arranged that the slightest flexure of the load spring due to compression will cause the dial pointer to turn in a clockwise direction and thus indicate the compression on the dial.

The pentrator spindle assembly is guided by oil-impregnated sintered bronze bushings 25 and 26, which are press-fitted into a precision bored hole 27 formed in the supporting bracket 9. A penetrator extension rod 28, which I prefer to make of stainless steel, chromium coated and highly polished, is press-fitted into the left section of the load spring 20. The penetrator extension rod and the load spring assembly are centered and guided by bushings 25 and 26 which are precision aligned and honed to provide a smooth sliding fit for the penetrator extension rod. The outer end of the penetrator extension rod is provided with a center hole (not shown) into which a penetrator 29 is inserted. The penetrator is secured in place by a retainer 30, the details of which are more fully described by my aforementioned co-pending application. The penetrator may be a sphero-conically shaped diamond, a hardened steel ball, or some other well-known or special type and shape of penetrating tool.

A cylindrical cap 33, which I prefer to make of high-strength aluminum alloy, is secured to the face of the supporting bracket 9. In the center of the cap and on the axis of the penetrator extension rod 28, an inner tubular support 34 made of hardened steel is press-fitted at 34a and thereby firmly secured against rotation and axial movement. The inner tubular support 34 is precision threaded internally to accommodate a threaded section 35a of a load spindle 35, which is also made of hardened steel. A bronze bushing 36 is interposed between the spindle 35 and the tubular support 34. The bushing is precision aligned and honed to maintain concentric alignment of the load spindle. An outer tubular stainless steel spider 37, which has a smooth sliding fit over the tubular support 34, is press-fitted onto an enlarged portion 35b of the load spindle and hence turns therewith. The left end of the load spindle 35 is seated to conform to the contour of a hardened steel ball 38 which is held in position by a press-fitted stainless steel retaining sleeve 39. A removable hardened steel button 42, seated to conform to the contour of the ball 38, is screwed into a stainless steel threaded sleeve 43 which is press-fitted into a hole in the load spring 20. The load spring is interposed between the load spindle 35 and the penetrator extension rod 28, which is press-fitted into the load spring at 28b.

A load handwheel 40, made of aluminum alloy or moulded plastic, is fastened to the right end of the load spindle by one or more set screws 41, each of which is perpendicular to a corresponding flat surface 35c, upon the load spindle. By turning the load handwheel 40 in a clockwise direction, as indicated by a direction plate 44 fastened upon the handwheel by rivets 45, the penetrator spindle assembly is moved to the left along the penetration axis. The movement is initially resisted by a pair of return springs 46, received in suitable recesses 9a formed in the bracket. When motion of the penetrator is resisted by contact with a specimen, the load spring 20 is compressed, and this compression will be indicated by the pointer on the dial indicator 23. By turning the load handwheel in a counter-clockwise direction as indicated by the direction plate 44, the return springs 46 will move the penetrator to the right along the penetration axis after the load has been removed from the penetrator.

Penetration Indicator

A barrel dial 47, which I prefer to make of aluminum alloy with a moulded plastic face 48 cemented thereon, is arranged to rotate in the same direction as the load handwheel but through a greater angle to provide for optimum spacing of hardness scales engraved on the plastic face 48. For approximately one-third revolution of the load handwheel, the barrel dial is made to rotate one revolution, thus providing for greater spacing between hardness numbers and consequently greater accuracy in hardness tests. This is accomplished by means of a planetary gearing mechanism including a non-rotating stainless steel base plate 49, which is concentric with the inner tubular support 34 and the outer tubular spider 37, and is prevented from rotating by a plurality of stainless steel guide pins 50 press-fitted into the base plate at 49a. The guide pins have a smooth sliding fit in stainless steel guide bushings 51, which are secured within holes 33a formed in the cap 33 by stainless steel washers 52 and nuts 53. A precision stainless steel internal gear 54, which is secured to the base plate 49 by a suitable cement, is also concentric with the support 34. On a flanged section 37a of the spider 37 are mounted stainless steel press-fitted studs 55, on which are rotatably supported three small equally spaced precision stainless steel spur gears 56 meshing with the internal gear 54. A bronze inner drum 57 is located concentrically about the spider 37, and a precision stainless steel spur gear 58 is cemented thereto and meshes with the spur gears 56. The barrel dial 47 is received over the inner drum 57 and is retained in position by a spring-retaining ring 59, which is secured within an annular groove in the barrel dial. A plurality of hardened steel balls 60 are received within equally spaced holes 47b in the upper face of the barrel dial and are biased into engagement with the drum 57 by means of compression springs 61. The balls are retained in place by a plurality of set screws 62. The barrel dial may thus be turned on the inner drum by finger pressure on the outer knurled edge of the barrel dial, but otherwise turns with the inner drum without slippage.

The left end of the outer tubular spider 37 is grooved to accommodate a spring retaining ring 63 which co-operates with a washer 64 to facilitate assembly of the parts. A pair of compression springs 65 are centered by collars 66 on the guide pins 50 and exert a pressure on the base plate 49 and the threaded sections of inner tubular support 34 through the load spindle 35 and the spider 37, for the purpose of preventing axial "backlash" even in the presence of worn threads. A washer 67 is interposed between the inner drum 57 and the load handwheel 40, which rotate at different speeds, to provide a bearing surface between the two.

By turning the load handwheel 40 in a clockwise direction, the spindle 35 and the spider 37 are traversed to the left along the penetration axis, carrying the barrel dial, the planetary gearing assembly, and the base plate 49. The spur gears 56 rotate and turn the spur gear 58, the inner drum 57, and the barrel dial 47. By choosing suitable gear ratios, the inner drum and the barrel dial can be made to turn at a greater speed, (or through a greater angle), than the load handwheel 40.

A pointer 68 comprising an angle shaped member, on the front side of which is engraved a fine line, is fastened to the underside of the non-rotating base plate 49 and acts as a reference line for the "set" position of the barrel dial, and for indicating hardness readings.

A load indicator guard bracket 82 is provided with reinforcing ribs 82a and is preferably made of lightweight material such as aluminum alloy. The bracket 82 is secured to the main frame bas by machine screws 83.

Second Anvil Spindle Assembly

The specimen or work to be hardness tested is held against the face of the anvil 14 (or some other type of anvil, depending upon the shape of the specimen), and may also be supported by a second anvil 77 which is made of hardened stainless steel and provided with a flat smooth upper surface. A supporting spindle 78, which is press-fitted into the anvil 77 and secured by a dowel pin 77a, is threaded into a stainless steel flanged sleeve 80 for threading movement along an axis transverse to the penetration axis. The flanged sleeve is fixedly secured within a hole 80a formed in the main frame 6, by means of a flanged cap screw 81 threaded in the sleeve, and by a dowel pin 80b. A further dowel pin 81a fixedly secures the cap screw in the main frame. A lock nut 79 is threaded on the spindle 78 to secure the anvil 77 in vertically adjusted positions by locking engagement of the nut with the flanged sleeve. A stainless steel scale 78a is cemented within a milled recess 78b in the spindle 78, and is calibrated to indicate the distance between the flat upper surface of the anvil 77 and the axis of penetration, when the lock nut 79 is in locking engagement with the flanged sleeve 80. By adjusting the height of the anvil 77 to proportionately correspond with the diameter of a cylindrical specimen, as indicated by the scale 78a, alignment of the diametrical axis of the specimen with the penetration axis will be readily provided by positioning the specimen upon the anvil, thereby assuring accurate hardness measurements.

Support Assemblies

If the work to be hardness tested is in the form of rods, tubes, and similar shapes of short as well as extended lengths which are supported in approximately the horizontal position, I provide means by which the tester is supported by the work being tested. These means comprise stainless steel support rods 84 which are removably threaded in stainless steel flanged sleeves 85 on the lower ends thereof. A hardened steel yoke 86 is received upon the support rods, and knurled nuts 87 are positioned on the threaded upper ends of the support rods for securing the yoke in position. The sleeves 85 are threaded into suitable bosses 88 formed in the main frame 6, and are fixedly secured by dowel pins 85a. The yoke is provided with a drilled hole 86a and a slotted section 86b at its opposite ends, which permit of a hinging action when positioning the tester on the work. If the work is in the form of a cylindrical rod or tube, the anvil 77 should be positioned for alignment of the diametrical axis of the work with the penetration axis. The work, shown in dotted lines at 89 in FIG. 1 by way of illustration, is interposed between the yoke, which supports the hardness tester thereon, and the anvil 77. The anvil 14, which may have any suitable form of surface, is also positioned to accommodate the diameter of the work, so that the anvils 14 and 77 and the yoke 86 contact the work at peripherally spaced points to provide a firm support. The tester may be conveniently moved along the work when making a plurality of hardness measurements.

A handle 90, which is preferably made of a light-weight material such as magnesium, and which is provided with a holding surface fashioned to fit the hand, is removably attached to the supporting bracket 9. The handle is attached by means of a stainless steel locking screw 91 threaded into a hardened stainless steel bushing 92, which is threaded into the bracket 9 and fixedly secured by a dowel pin 92a. A knurled stainless steel knob 93 is press-fitted to the locking screw 91 and retained in position by means of a dowel pin 93a. Stainless steel flanged sleeves 94 and 95 are press-fitted into a bored hole 91a in the handle to retain the locking screw 91 in position, and to provide thrust surfaces for the attachment of the handle to the tester. A dowel pin 96 is press-fitted into the handle face and retains a washer 96a flush with the face of the handle. The pin 96 slidingly receives a hardened steel bushing 97 press-fitted into the bracket 9, thereby preventing rotary movement of the handle about the locking screw axis when the handle is attached to the tester. A spiral compression spring 98 and a spring-type retaining ring 99 are received in the hole 91a to bias the locking screw 91 outwardly from the handle when the handle is detached from the tester, thereby withdrawing the threaded end of the locking screw within the flanged bushing 95 to prevent accidental damage.

The machine may be adapted for use as a bench-type hardness tester by detaching the handle 90, the support rods 84, and the yoke 86, and attaching a base plate 100 to the main frame. The base plate is made of a light-weight material such as aluminum alloy, and may be fabricated from rolled plate stock. The attaching means comprise stainless steel flanged studs 101, which are threaded at their lower ends. The studs extend normal to the base plate through counterbored holes formed therein, and are secured by means of washers 102 and 103, and a nut 104. The upper end of each of the studs is slidingly received in a hardened stainless steel bushing 105, which is press-fitted into the main frame and fixedly secured in position by a dowel pin 105a. A knurled stainless steel retaining nut 106 is threaded on a flange 107 of each bushing 105, and overlies a flange 108 of the stud 101 to securely attach the base plate to the machine. Rubber feet 109 are fastened to the sides of the main frame 6 and the vertical supporting brackets 8 and 9 by means of machine screws 110 and washers 111, to protect the machine from accidental damage of misalignment of parts when attaching and detaching the various attachments which have been described.

Operation

Cylindrical work should be tested with V-notch anvils or the equivalent, which will orient the specimen on the penetration axis. Flat-surfaced specimens should be tested on an anvil of the type shown, which has a smooth flat surface perpendicular to the penetration axis. For thin work specimens, or specimens which are not perfectly flat, the anvil should have an elevated flat surface of relatively small area.

In making a hardness test, all paint, scale or other surface deposits should be removed from the work in the area of the surface to be tested and in the area to be in contact with the anvils and the yoke, if the latter is to be employed.

After the work has been placed and supported on the appropriate supporting means and these means have been adjusted and locked in position, the face of the dial indicator is turned by means of its bezel 23a until the circular dot mark on the indicator dial coincides with the position of the dial pointer, to provide a no-load calibration of the dial indicator. The load handwheel is then turned in a clockwise direction until the penetrator is resisted by the specimen and the pointer on the dial indicator coincides with the line on the dial marked SET. The force or load thus applied by the penetrator to the surface of the specimen is generally referred to as the "minor" load, applied to avoid inaccuracy due to surface imperfections in the specimen. The penetration caused by the minor load provides a reference point from which the depth of penetration caused by a major load may be measured to determine the hardness of the specimen. The barrel dial 47 is then turned by hand (relative to the handwheel), until the line marked "0" and "100" on the engraved scale coincides with the reference line on the fixed pointer 68. The load handwheel is again turned in a clockwise direction, the barrel dial turning in the same direction but through a greater angle, until the pointer on the dial indicator coincides with one of the lines on the dial marked (F, H, A), (D, E, B) or (C, G, K), respectively. The selection of one of these loadings depends in part upon the kind of penetrator used, and is determined by the relative hardness of the work being tested, as is well known to those skilled in the art. The load thus applied represents the major load. After the dial pointer comes to rest at the chosen line without further "sinking" of the penetrator into the specimen, the load handwheel is immediately turned in a counter-clockwise direction until the pointer of the dial indicator again coincides with the line on the dial marked SET. The appropriate scale reading on the barrel dial (B or C scale) which then coincides with the reference line on the fixed pointer 68 gives the hardness number of the specimen being tested, either directly or by a conversion table or chart, depending upon the type of penetrator and the loading used in making the test. After noting the hardness number, the load handwheel is turned further in the counter-clockwise direction to remove the penetrator from the surface of the specimen, as indicated by the return of the pointer on the dial indicator to its no-load position coinciding with the dot position on the dial.

Although I have shown and described a specific embodiment of my invention for illustrative purposes, it is to be understood that the invention is not limited to the specific mechanical details described, for numerous modifications within the spirit of the invention will readily occur to one skilled in the art to which it pertains. Therefore, it is my intention that the limits of the invention be defined only by the appended claims.

Having thus disclosed my invention, what I claim as new and desire to secure by Letters Patent of the United States is:

1. A hardness tester comprising, in combination; a frame formed with two spaced apart transversely-extending brackets, penetrator mounted in a first one of said brackets and positioned along a penetration axis, means mounted on said first bracket for applying a predetermined load through said penetrator along said axis to a work-piece, means for measuring the resulting movement of said penetrator into the work-piece along said axis, a first anvil adjustably mounted in the other of said brackets for movement to engage the work-piece along said penetration axis, a second anvil adjustably mounted in said frame for movement to engage the work-piece along an axis normal to said penetration axis, and yoke means adjustably mounted in said frame and extending parallel to said penetration axis across said normal axis for movement to engage the work-piece upon a surface thereof opposite said second anvil to support said hardness tester upon the work-piece.

2. A hardness tester comprising, in combination; a frame formed with two spaced apart transversely-extending brackets, a penetrator mounted in a first one of said brackets and positioned along a penetration axis, means mounted on said first bracket for applying a predetermined load through said penetrator along said axis to a work-piece, means for measuring the resulting movement of said penetrator into the work-piece along said axis, a first anvil adjustably mounted in the other of said brackets for movement to engage the work-piece along said penetration axis, a second anvil adjustably mounted in said frame for movement to engage the work-piece along an axis normal to said penetration axis, an indicator secured to said second anvil and cooperating with said frame to indicate the distance of said second anvil from said penetration axis along said normal axis, whereby said second anvil is adapted for adjustment to support a symmetrical work-piece with an axis of symmetry thereof coinciding with said penetration axis, and yoke means adjustably mounted in said frame and extending parallel to said penetration axis across said normal axis for movement to engage the work-piece upon a surface thereof opposite said second anvil to support said hardness tester upon the work-piece.

References Cited in the file of this patent

UNITED STATES PATENTS

| | | |
|---|---|---|
| 1,817,170 | Showers | Aug. 4, 1931 |
| 1,890,923 | Wilson | Dec. 13, 1932 |
| 2,384,437 | Boynton | Sept. 11, 1945 |
| 2,466,567 | Williams | Apr. 5, 1949 |
| 2,643,544 | Chester | June 30, 1953 |
| 2,722,831 | Smith | Nov. 8, 1955 |

OTHER REFERENCES

"Hirth Minimeter for Accurate Measuring," Falkiner Machinery Co. publication, page 14.